(12) United States Patent
Ono et al.

(10) Patent No.: US 9,151,019 B2
(45) Date of Patent: Oct. 6, 2015

(54) HYBRID TYPE CONSTRUCTION MACHINE (75) Inventors: Tetsuji Ono, Kanagawa (JP); Chunnan Wu, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 726 days.

(21) Appl. No.: 13/395,690

(22) PCT Filed: Sep. 14, 2010

(86) PCT No.: PCT/JP2010/065854
§ 371 (c)(1),
(2), (4) Date: Mar. 13, 2012

(87) PCT Pub. No.: WO2011/034061
PCT Pub. Date: Mar. 24, 2011

(65) Prior Publication Data
US 2012/0167561 A1 Jul. 5, 2012

(30) Foreign Application Priority Data
Sep. 15, 2009 (JP) ................. 2009-213642

(51) Int. Cl.
F15B 21/14 (2006.01)
E02F 9/22 (2006.01)
(Continued)

(52) U.S. Cl.
CPC .............. *E02F 9/2296* (2013.01); *B60K 6/46* (2013.01); *E02F 9/2075* (2013.01); *E02F 9/2235* (2013.01); *E02F 9/2242* (2013.01); *E02F 9/2282* (2013.01); *E02F 9/2292* (2013.01); *Y02T 10/6217* (2013.01)

(58) Field of Classification Search
CPC ...... F15B 21/14; E02F 9/2296; E02F 9/2282; E02F 9/2075; E02F 9/2292; E02F 9/2235; E02F 9/2242
USPC .................... 60/414, 420, 422, 486
See application file for complete search history.

(56) References Cited

U.S. PATENT DOCUMENTS 6,851,207 B2 * 2/2005 Yoshimatsu ............... 60/420
6,989,640 B2 * 1/2006 Yoshimatsu ............... 318/34

(Continued)

FOREIGN PATENT DOCUMENTS

JP 2002-242234 8/2002
JP 2003-155760 5/2003

(Continued)

OTHER PUBLICATIONS

International Search Report mailed on Oct. 26, 2010.

*Primary Examiner* — Thomas E Lazo
(74) *Attorney, Agent, or Firm* — IPUSA, PLLC (57) ABSTRACT A hybrid-type construction machine comprises an engine 11; an electric power accumulator 19B; first and second pumps 28, 14; a motor generator 27 for driving the first pump 28; and plural actuators 1A, 1B, 7, 8 and 9 which are driven by the first and second pumps 28, 14, wherein the first and second pumps 28, 14 are arranged such that the first pump 28 controls at least one of the actuators 1A, 1B, 7, 8 and 9 independently from the second pump 14 and the second pump 14 controls at least another one of the actuators 1A, 1B, 7, 8 and 9 independently from the first pump 28, the first pump 28 is electrically driven by the motor generator 27 with electric power from the electric power accumulator 19B, and the second pump 14 is directly coupled to the engine 11.

8 Claims, 8 Drawing Sheets (51) Int. Cl.
  *B60K 6/46* (2007.10)
  *E02F 9/20* (2006.01)

(56) References Cited

U.S. PATENT DOCUMENTS 7,669,413 B2 * 3/2010 Komiyama et al. ............ 60/414

2005/0001567 A1 1/2005 Yoshimatsu

FOREIGN PATENT DOCUMENTS

JP 2007-010006 1/2007
JP 2007-177437 7/2007

* cited by examiner

| | | | ○:USING PUMP —:NOT USING PUMP | |
|---|---|---|---|---|
| NO. | OPERATION | TYPE | FIRST PUMP | SECOND PUMP |
| 1 | SINGLE OPERATION | TURNING | ○ | — |
| 2 | | TRAVELING | ○ | ○ |
| 3 | | BOOM-UP (FIRST SPEED) | — | ○ |
| 4 | | BOOM-UP (SECOND SPEED) | ○ | ○ |
| 5 | | BOOM-DOWN | — | ○ |
| 6 | | ARM CLOSING (FIRST SPEED) | ○ | ○ |
| 7 | | ARM CLOSING (SECOND SPEED) | ○ | ○ |
| 8 | | ARM OPENING | ○ | ○ |
| 9 | | BUCKET OPENING/CLOSING | — | ○ |
| 10 | COMBINED OPERATION | BOOM-DOWN AND TURNING | ○ | ○ |
| 11 | | BOOM-DOWN AND BUCKET OPENING/CLOSING | — | ○ |
| 12 | | BOOM-DOWN AND ARM CLOSING (FIRST SPEED) | ○ | ○ |
| 13 | | BOOM-DOWN AND ARM CLOSING (SECOND SPEED) | ○ | ○ |
| 14 | | BOOM-DOWN AND ARM OPENING | ○ | ○ |
| 15 | | BOOM-DOWN AND TRAVELING | ○ | ○ |
| 16 | | BUCKET OPENING/CLOSING AND ARM CLOSING (FIRST SPEED) | ○ | ○ |
| 17 | | BUCKET OPENING/CLOSING AND ARM CLOSING (SECOND SPEED) | ○ | ○ |
| 18 | | BUCKET OPENING/CLOSING AND ARM OPENING | ○ | ○ |
| 19 | | BOOM-UP (FIRST SPEED) AND BUCKET OPENING/CLOSING | — | ○ |
| 20 | | BOOM-UP (FIRST SPEED) AND ARM CLOSING (FIRST SPEED) | ○ | ○ |
| 21 | | BOOM-UP (FIRST SPEED) AND ARM CLOSING (SECOND SPEED) | ○ | ○ |
| 22 | | BOOM-UP (FIRST SPEED) AND ARM OPENING | ○ | ○ |
| 23 | | BOOM-UP (SECOND SPEED) AND ARM OPENING/CLOSING | ○ | ○ |

| NO. | OPERATION | TYPE | FIRST PUMP | SECOND PUMP |
|---|---|---|---|---|
| | | ○:USING PUMP  —:NOT USING PUMP | | |
| 1 | SINGLE OPERATION | TURNING | — | — |
| 2 | | TRAVELING | ○ | ○ |
| 3 | | BOOM-UP (FIRST SPEED) | — | ○ |
| 4 | | BOOM-UP (SECOND SPEED) | ○ | ○ |
| 5 | | BOOM-DOWN | — | ○ |
| 6 | | ARM CLOSING (FIRST SPEED) | ○ | ○ |
| 7 | | ARM CLOSING (SECOND SPEED) | ○ | ○ |
| 8 | | ARM OPENING | ○ | ○ |
| 9 | | BUCKET OPENING/CLOSING | — | ○ |
| 10 | COMBINED OPERATION | BOOM-DOWN AND TURNING | — | ○ |
| 11 | | BOOM-DOWN AND BUCKET OPENING/CLOSING | — | ○ |
| 12 | | BOOM-DOWN AND ARM CLOSING (FIRST SPEED) | ○ | ○ |
| 13 | | BOOM-DOWN AND ARM CLOSING (SECOND SPEED) | ○ | ○ |
| 14 | | BOOM-DOWN AND ARM OPENING | ○ | ○ |
| 15 | | BOOM-DOWN AND TRAVELING | ○ | ○ |
| 16 | | BUCKET OPENING/CLOSING AND ARM CLOSING (FIRST SPEED) | ○ | ○ |
| 17 | | BUCKET OPENING/CLOSING AND ARM CLOSING (SECOND SPEED) | ○ | ○ |
| 18 | | BUCKET OPENING/CLOSING AND ARM OPENING | ○ | ○ |
| 19 | | BOOM-UP (FIRST SPEED) AND BUCKET OPENING/CLOSING | — | ○ |
| 20 | | BOOM-UP (FIRST SPEED) AND ARM CLOSING (FIRST SPEED) | ○ | ○ |
| 21 | | BOOM-UP (FIRST SPEED) AND ARM CLOSING (SECOND SPEED) | ○ | ○ |
| 22 | | BOOM-UP (FIRST SPEED) AND ARM OPENING | ○ | ○ |
| 23 | | BOOM-UP (SECOND SPEED) AND ARM OPENING/CLOSING | ○ | ○ |

| | | O: USING PUMP  —: NOT USING PUMP<br>M: MOTOR REGENERATIVE OPERATION | | |
|---|---|---|---|---|
| NO. | OPERATION | TYPE | FIRST PUMP | SECOND PUMP |
| 1 | SINGLE OPERATION | TURNING | — | — |
| 2 | | TRAVELING | O | O |
| 3 | | BOOM-UP (FIRST SPEED) | — | O |
| 4 | | BOOM-UP (SECOND SPEED) | O | O |
| 5 | | BOOM-DOWN | M | O |
| 6 | | ARM CLOSING (FIRST SPEED) | O | O |
| 7 | | ARM CLOSING (SECOND SPEED) | O | O |
| 8 | | ARM OPENING | O | O |
| 9 | | BUCKET OPENING/CLOSING | — | O |
| 10 | COMBINED OPERATION | BOOM-DOWN AND TURNING | M | O |
| 11 | | BOOM-DOWN AND BUCKET OPENING/CLOSING | M | O |
| 12 | | BOOM-DOWN AND ARM CLOSING (FIRST SPEED) | M | O |
| 13 | | BOOM-DOWN AND ARM CLOSING (SECOND SPEED) | O | O |
| 14 | | BOOM-DOWN AND ARM OPENING | M | O |
| 15 | | BOOM-DOWN AND TRAVELING | M | O |
| 16 | | BUCKET OPENING/CLOSING AND ARM CLOSING (FIRST SPEED) | — | O |
| 17 | | BUCKET OPENING/CLOSING AND ARM CLOSING (SECOND SPEED) | O | O |
| 18 | | BUCKET OPENING/CLOSING AND ARM OPENING | — | O |
| 19 | | BOOM-UP (FIRST SPEED) AND BUCKET OPENING/CLOSING | — | O |
| 20 | | BOOM-UP (FIRST SPEED) AND ARM CLOSING (FIRST SPEED) | — | O |
| 21 | | BOOM-UP (FIRST SPEED) AND ARM CLOSING (SECOND SPEED) | O | O |
| 22 | | BOOM-UP (FIRST SPEED) AND ARM OPENING | — | O |
| 23 | | BOOM-UP (SECOND SPEED) AND ARM OPENING/CLOSING | O | O |

HYBRID TYPE CONSTRUCTION MACHINE

TECHNICAL FIELD

The present invention is related to a hybrid-type construction machine in which a part of driven mechanism is motorized.

BACKGROUND ART

JP2007-10006 A discloses the hybrid-type construction machine in which a part of driven mechanism is motorized. According to the disclosed hybrid-type construction machine, an engine is directly coupled to a motor generator which functions as an electric motor and a generator, and a rotating shaft of the motor generator is connected to rotating shafts of first and second variable displacement pumps in series. For the first and second pumps, a third variable displacement pump which is driven by the motor generator is provided separately. The first pump mainly supplies fluid in a tank to a boom cylinder circuit for controlling a boom cylinder; the second pump mainly supplies fluid in the tank to an arm cylinder circuit for controlling an arm cylinder; and the third pump supplies fluid in the tank to a turning motor circuit for controlling a turning motor. Further, a discharge port of the third pump is connected to a pressure fluid replenishing circuit for replenishing pressure fluid to the boom cylinder circuit and the arm cylinder circuit.

In ordinary construction machines, as is the case with the construction machine disclosed in JP2007-10006 A, two pumps (first and second pumps) are coupled to the rotating shaft of the motor generator in series which is directly coupled to the engine. However, depending on operations of the construction machine, there are cases in which two pumps are not always necessary. In such cases, the fact that the two pumps are coupled to the engine leads to waste of energy. Further, in the case of the hybrid-type construction machine, frequency of use of one of two pumps tends to decrease. For example, if the turning motor is motorized, there may be a case in which one of two motors suffices for a combined operation of a boom-down operation and a turning operation.

SUMMARY OF INVENTION

Therefore, an object of the present invention is to provide a hybrid-type construction machine in which two pumps are arranged effectively.

According to an aspect of the present invention, a hybrid-type construction machine is provided which comprises an engine; an electric power accumulator; first and second pumps; an electric motor for driving the first pump; and plural actuators which are driven by the first and second pumps, wherein the first and second pumps are arranged such that the first pump controls at least one of the actuators independently from the second pump and the second pump controls at least another one of the actuators independently from the first pump;

the first pump is electrically driven by the electric motor using electric power from the electric power accumulator; and the second pump is directly coupled to the engine.

According to the present invention, a hybrid-type construction machine in which two pumps are arranged effectively can be obtained.

EXPLANATION FOR REFERENCE NUMBERS 1A travel right motor
1B travel left motor
7 boom cylinder
8 arm cylinder
9 bucket cylinder
11 engine
12 motor generator
14 second hydraulic pump
17 control valve
18 inverter
19 battery unit
19B battery
20 inverter
21 turning motor
24 turning mechanism
25 inverter
27 motor generator
28 first hydraulic pump
30 controller
40 reservoir tank
42 first oil line
44 second oil line
46, 48 negative control restrictor
50, 52 variable pressure relief valve
54, 56 regulator
60 relief valve
62 reservoir tank
64 regenerative circuit
66 flow control valve
68 heck valve
100 hybrid-type construction machine
171-178 switching valves of control valve

BEST MODE FOR CARRYING OUT THE INVENTION

In the following, the best mode for carrying out the present invention will be described in detail by referring to the accompanying drawings.

Figure 1:
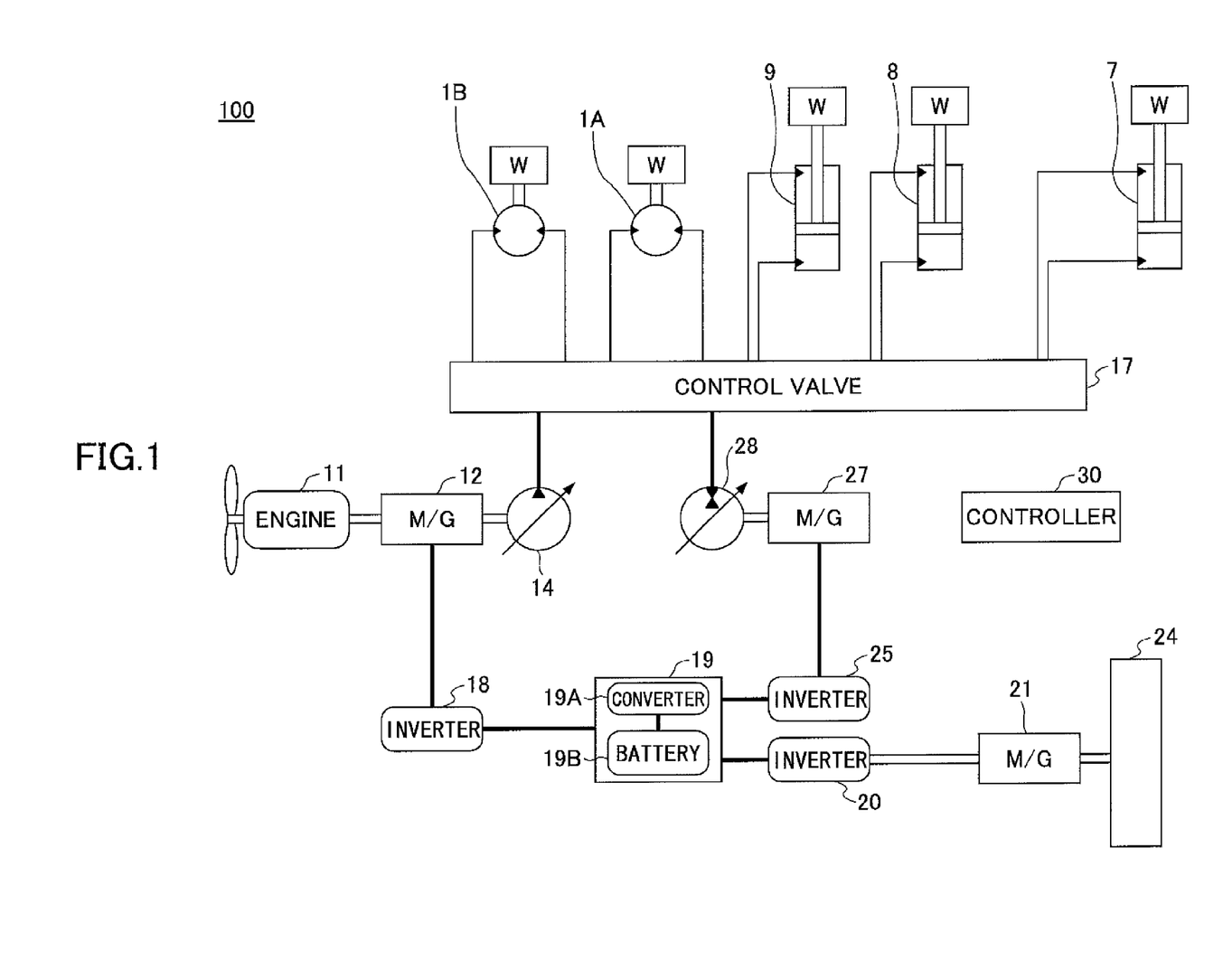
FIG. 1 is a diagram of a main configuration for illustrating a feature configuration of a hybrid-type construction machine 100 according to the present invention.

FIG. 1 is a diagram of a main configuration for illustrating a feature configuration of a hybrid-type construction machine 100 according to the present invention. It is noted that the hybrid-type construction machine 100 may of any type including a hydraulic shovel, a lifting magnet, etc. In FIG. 1, connections related to mechanical power are indicated by double lines, hydraulic lines are indicated by solid lines, and connections related to electrical drive are indicated by bold lines.

The hybrid-type construction machine 100 includes an engine 11 which is an internal combustion engine. The engine 11 is mechanically and directly coupled to a motor generator (M/G) 12. A rotating shaft of the motor generator 12 is mechanically coupled to a variable displacement hydraulic pump 14 (referred to as a second hydraulic pump 14, hereinafter).

The second hydraulic pump 14 is a swash plate hydraulic pump, for example, whose output can be varied by changing an angle of a swash plate. Specifically, the angle of the swash plate is adjusted by changing control current applied to the second hydraulic pump 14, which enables changing the output of the second hydraulic pump 14. The second hydraulic pump 14 is driven by output of the engine 11 and/or the motor generator 12 to discharge high pressure working fluid. It is noted that the engine 11 and the motor generator 12 are coupled to a splitter (a power transfer mechanism), and power is transmitted to the second hydraulic pump 14 via the splitter.

The motor generator 12 is electrically coupled to a battery unit 19 via an inverter 18. The battery unit 19 includes a converter 19A and a battery 19B. The battery 19B may be any type as long as it is secondary battery. For example, the battery 19B may be a lead acid battery, a nickel-hydrogen battery, a lithium ion battery, an electric double layer capacitor, etc. It is noted that the inverter 18 is controlled by a controller 30.

The battery unit 19 is electrically connected to a turning motor 21 via an inverter 20. An output shaft of the turning motor 21 is coupled to a turning mechanism 24 for turning an upper-part turning body of the hybrid-type construction machine 100. In this way, the turning mechanism 24 is driven with electric power from the battery unit 19. The inverter 20 is controlled based on operations of a turning operation lever by the controller 30. It is noted that as described hereafter with reference with a first embodiment, instead of a turning motor 21 (see FIG. 1) which is electrically driven by the battery unit 19 and the inverter 20, a turning motor 21 which is hydraulically driven with oil pressure generated by a first hydraulic pump 28 described hereinafter (or the second hydraulic pump 14).

The battery unit 19 is electrically connected to a motor generator (M/G) 27 via an inverter 25. An output shaft of the motor generator 27 is mechanically coupled to the variable displacement hydraulic pump 28 (referred to as the first hydraulic pump 28, hereinafter). It is noted that the inverter 25 is controlled by the controller 30.

The first hydraulic pump 28 is a swash plate hydraulic pump, for example, whose output can be varied by changing an angle of a swash plate. Specifically, the angle of the swash plate is adjusted by changing control current applied to the first hydraulic pump 28, which enables changing the output of the first hydraulic pump 28. The first hydraulic pump 28 is driven with electrical power from the battery unit 19. Specifically, the first hydraulic pump 28 is driven with the output of the motor generator 27 to discharge high pressure working fluid.

The first hydraulic pump 28 and the second hydraulic pump 14 are hydraulically connected to corresponding associated actuators via a control valve 17. In the illustrated example, the actuators include a travel right motor 1A for driving a right wheel of the hybrid-type construction machine 100, a travel left motor 1B for driving a left wheel, a boom cylinder 7 for driving a boom in up and down directions, an arm cylinder 8 for opening or closing an arm, and a bucket cylinder 9 for opening or closing a bucket.

One of feature configurations of the present invention is that the first hydraulic pump 28 and the second hydraulic pump 14 are arranged such that the first pump 28 controls at least one of the actuators 1A, 1B, 7, 8 and 9 independently from the second pump 14 and the second pump 14 controls at least another one of the actuators 1A, 1B, 7, 8 and 9 independently from the first pump 28. In other words, at least one dedicated hydraulic actuator is allocated to each of the first hydraulic pump 28 and the second hydraulic pump 14. The dedicated hydraulic actuators allocated to the first hydraulic pump 28 and the second hydraulic pump 14 may be of any type. For example, the first hydraulic pump 28 may control the travel left motor 1B independently from the second hydraulic pump 14, and the second hydraulic pump 14 may control the travel right motor 1A independently from the first hydraulic pump 28. However, even in this case, the first hydraulic pump 28 may be in fluid communication with the travel right motor 1A via a switching valve and the second hydraulic pump 14 may in fluid communication with the travel left motor 1B via a switching valve.

Further, another of the feature configurations of the present invention is that a hydraulic pump for driving an actuator(s) that is coupled to the engine 11 and the motor generator 12 includes the second hydraulic pump 14 only. In other words, only the second hydraulic pump 14 is coupled to the engine 11 and the motor generator 12 as a hydraulic pump for driving an actuator(s). Specifically, in general, two hydraulic pumps used for driving actuators are directly coupled to the engine 11 and the motor generator 12; however, one of the hydraulic pumps is left as it is, while another hydraulic pump is omitted, and instead of it, a hydraulic pump (the first hydraulic pump 28) for driving an actuator(s) is provided, which hydraulic pump is driven by the motor generator 27 (separate from the motor generator 12) using electric power from the battery unit 19. It is noted that a hydraulic pump which is not used for driving an actuator(s), for example, a pilot pump which generates pilot pressure necessary for hydraulic operating systems may be coupled to the engine 11 and the motor generator 12.

According to the feature configurations of the present invention, since only one of the hydraulic pumps, which is used for driving an actuator(s), is coupled to the engine 11 and the motor generator 12, it is possible to reduce pumping loss at the time of idling by more than one-half with respect to an ordinary configuration in which two hydraulic pumps, which are used for driving actuators, are coupled to the engine 11 and the motor generator 12. Further, in order to compensate for the fact that only one hydraulic pump, which is used for driving an actuator(s), is coupled to the engine 11 and the motor generator 12, a hydraulic pump (the first hydraulic pump 28) for driving an actuator(s) is provided which hydraulic pump is driven by the motor generator 27 (separate from the motor generator 12) using electric power from the battery unit 19. Therefore, it is possible to avoid waste of output while enabling supplying oil pressure and flow rate necessary for the actuators 1A, 13, 7, 8 and 9.

Next, the feature configurations described above are explained in more detail using several embodiments.

[First Embodiment]

Figure 2:
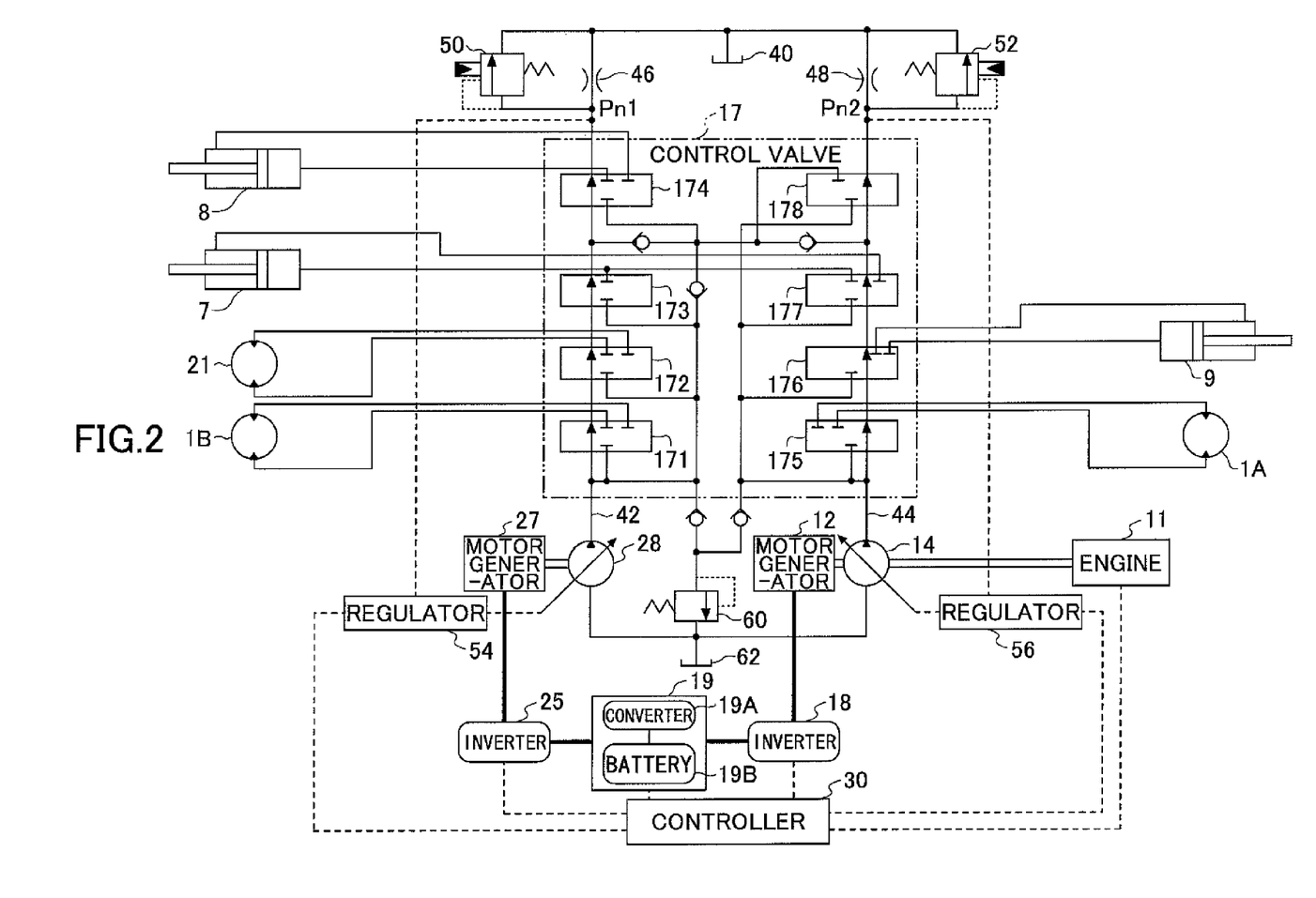
FIG. 2 is a block diagram for illustrating a main part of a hydraulic system configuration according to a first embodiment.

FIG. 2 is a block diagram for illustrating a main part of a hydraulic system configuration according to a first embodiment. In FIG. 2, elements which may be the same as corresponding elements illustrated in FIG. 1 are given the same reference numerals. Further, in FIG. 2, connections related to mechanical power are indicated by double lines, hydraulic lines are indicated by solid lines, electrical connections are indicated by bold line and connections related to control are indicated by dashed lines.

It is noted that in the first embodiment, unlike the configuration described with reference to FIG. 1, instead of the turning motor 21 (i.e., the electric motor as illustrated in FIG. 1) which is electrically driven by the battery unit 19 and the inverter 20, the turning motor (a hydraulic motor) 19 which is hydraulically driven with the oil pressure generated by the first hydraulic pump 28 is used.

The control valve 17 includes plural switching valves 171 through 178. The switching valves 171 through 174 are provided in a first oil line 42 connecting the discharge side of the first hydraulic pump 28 and a reservoir tank 40, and the switching valves 175 through 178 are provided in a second oil line 44 connecting the discharge side of the second hydraulic pump 14 and the reservoir tank 40.

The switching valve 171 switches supply status of the working fluid for implementing a traveling operation of the travel left motor 1B, the switching valve 172 switches supply status of the working fluid for implementing a turning operation of the turning motor 21, the switching valve 173 switches supply status of the working fluid for implementing a boom-up operation (second speed) of the boom cylinder 7, and the switching valve 174 switches supply status of the working fluid for implementing an arm opening/closing operation (first speed) of the arm cylinder 8.

The switching valve 175 switches supply status of the working fluid for implementing a traveling operation of the travel right motor 1A, the switching valve 176 switches supply status of the working fluid for implementing a bucket opening/closing operation of the bucket cylinder 9, the switching valve 177 switches supply status of the working fluid for implementing a boom-up/down operation (first speed) of the boom cylinder 7, and the switching valve 178 switches supply status of the working fluid for implementing an arm-opening/closing operation (second speed) of the arm cylinder 8.

In the first oil line 42 on the side of the first hydraulic pump 28, a negative control restrictor 46 (a restrictor for negative feedback) is provided between a downstream side of the switching valve 174 and the reservoir tank 40, and a negative control. pressure Pn1 (a pressure at a upstream side of the negative control restrictor 46 is output to a regulator 54 for the negative feedback. The first oil line 42 is connected to a variable pressure relief valve 50 for adjusting a relief pressure of the first oil line 42. The controller 30 and the regulator 54 control the first hydraulic pump 28 based on the negative control pressure Pn1 such that a loss of rate of discharge of the first hydraulic pump 28 returning to the reservoir tank 40 is reduced (i.e., performs so-called negative control).

Similarly, in the second oil line 44 on the side of the second hydraulic pump 14, a negative control restrictor 48 (a restrictor for negative feedback) is provided between a downstream side of the switching valve 178 and the reservoir tank 40, and a negative control pressure Pn2 (a pressure at a upstream side of the negative control restrictor 48 is output to a regulator 56 for the negative feedback. The second oil line 44 is connected to a variable pressure relief valve 52 for adjusting a relief pressure of the second oil line 44. The controller 30 and the regulator 56 control the second hydraulic pump 14 based on the negative control pressure Pn2 such that a loss of rate of discharge of the second hydraulic pump 14 returning to the reservoir tank 40 is reduced (i.e., performs so-called negative control). In this way, the first hydraulic pump 28 and the second hydraulic pump 14 are mechanically separated.

Further, the first oil line 42 and the second oil line 44 are connected to a relief valve 60 for limiting the maximum pressure of the hydraulic circuit. When a pressure in the hydraulic circuit exceeds a predetermined set pressure, the relief valve 60 is activated to connect the hydraulic circuit to a reservoir tank 62.

Figure 3:
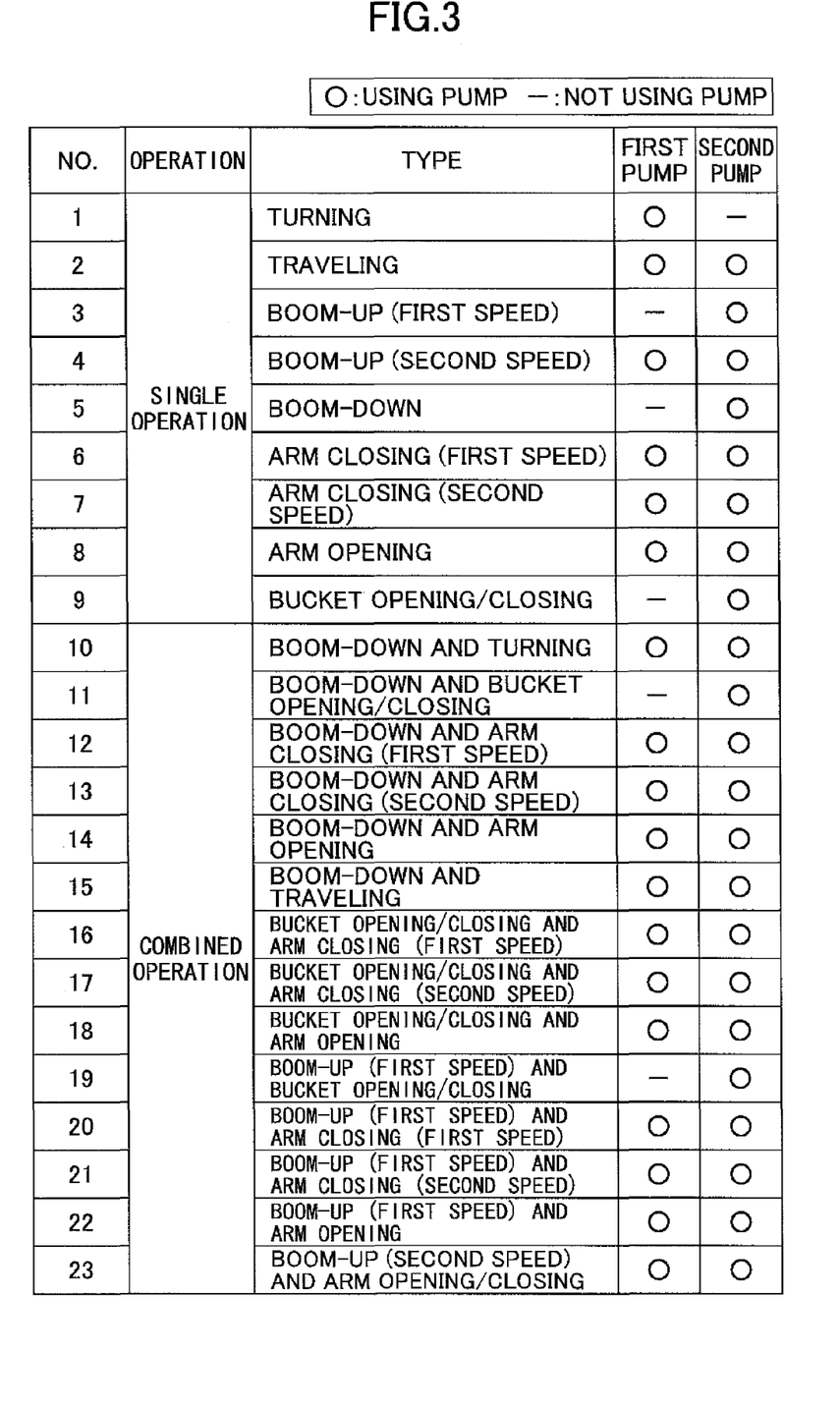
FIG. 3 is a table for illustrating a relationship between various operations of the hybrid-type construction machine 100 according to the first embodiment and hydraulic pumps used for the operations.

FIG. 3 is a table for illustrating a relationship between various operations of the hybrid-type construction machine 100 according to the first embodiment and hydraulic pumps used for the operations.

As illustrated in FIG. 3, at the turning operation alone, only the first hydraulic pump 28 is used, and thus the second hydraulic pump 14 is not operated. In this case, since the engine 11 continues to operate, the rotating motion of the second hydraulic pump 14 continues, but the second hydraulic pump 14 is in a non-output status. Further, at the boom-up operation (first speed) alone, only the second hydraulic pump 14 is used, and thus the first hydraulic pump 28 is not operated. Further, at the boom-down operation alone, only the second hydraulic pump 14 is used, and thus the first hydraulic pump 28 is not operated. In this case, the first hydraulic pump 28 continues the rotating motion with the motor generator 27, but the first hydraulic pump 28 is in a non-output status. Further, at the bucket opening/closing operation alone, only the second hydraulic pump 14 is used, and thus the first hydraulic pump 28 is not operated. Further, at the combined operation of the boom-down operation and the bucket opening/closing operation, only the second hydraulic pump 14 is used, and thus the first hydraulic pump 28 is not operated. Further, at the combined operation of the boom-up operation (first speed) and the bucket opening/closing operation, only the second hydraulic pump 14 is used, and thus the first hydraulic pump 28 is not operated.

One of feature configurations of the first embodiment is that the first hydraulic pump 28 and the second hydraulic pump 14 are arranged such that the first pump 28 controls at least one of the actuators 1A, 1B, 7, 8, 9 and 21 independently from the second pump 14 and the second pump 14 controls at least another one of the actuators 1A, 1B, 7, 8, 9 and 21 independently from the first pump 28. Specifically, the first hydraulic pump 28 is arranged to control the travel left motor 1B and the turning motor 21 independently from the second hydraulic pump 14, and the second hydraulic pump 14 is arranged to control the travel right motor 1A and the bucket cylinder 9 independently from the first hydraulic pump 28. However, even in this case, the first hydraulic pump 28 may be in fluid communication with the travel right motor 1A via a switching valve (not illustrated) and the second hydraulic pump 14 may in fluid communication with the travel left motor 1B via a switching valve (not illustrated).

Further, one of feature configurations of the first embodiment is that the second hydraulic pump 14 is only a hydraulic pump for driving an actuator(s) that is coupled to the engine 11 and the motor generator 12. In other word, only the second hydraulic pump 14 is coupled to the engine 11 and the motor generator 12 as a hydraulic pump for driving an actuator(s).

Figure 4:
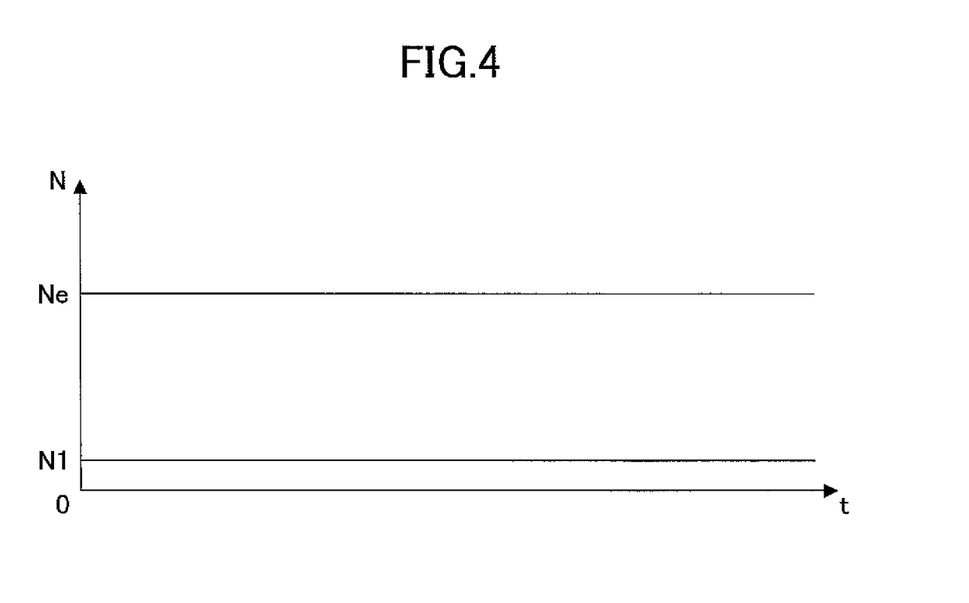
FIG. 4 is a graph for illustrating an example of time series relationship between an engine rpm of an engine 11 and a first pump 28.

According to the feature configurations of the first embodiment, since only one of the hydraulic pumps, which is used for driving an actuator(s), is coupled to the engine 11 and the motor generator 12, it is possible to reduce pumping loss at the time of idling by more than one-half with respect to the configuration in which two hydraulic pumps, which are used for driving actuators, are coupled to the engine 11 and the motor generator 12. Further, in order to compensate for the fact that only one hydraulic pump, which is used for driving actuators, is coupled to the engine 11 and the motor generator 12, a hydraulic pump (the first hydraulic pump 28) for driving actuators is provided, which hydraulic pump is driven by the motor generator 27 (separate from the motor generator 12) using electric power from the battery unit 19. Therefore, it is possible to avoid waste of output while enabling supplying oil pressure and flow rate necessary for the actuators 1A, 1B, 7, 8, 9 and 21. Specifically, as illustrated in FIG. 3, at the boom-up operation (second speed) alone, for example, the first hydraulic pump 28 and the second hydraulic pump 14 are operated and thus it is possible to supply oil pressure and flow rate necessary and sufficient for the boom cylinder 7. On the other hand, at the boom-up operation (first speed) alone, for example, only the first hydraulic pump 28 is operated to supply oil pressure and flow rate necessary and sufficient for the boom cylinder 7. Thus, it is possible to reduce an energy loss by stopping the first hydraulic pump 28. For example, as conceptually illustrated in FIG. 4, even if the number of revolutions N1 necessary for the first hydraulic pump 28 is sufficiently lower than the engine rpm Ne (for example, Ne is 1800 rpm, and N1 is 0-1000 rpm), the number of revolutions N1 does not become excessively high according to the engine rpm Ne. Thus, it is possible to operate the first hydraulic pump 28 at an optimal number of revolutions N1 and thus avoid waste of output of the first hydraulic pump 28.

In the first embodiment, a case is described where the rotating motion of the first hydraulic pump 28 continues; however, since the first hydraulic pump 28 is not coupled to the engine 11, it is possible to stop the rotating motion of the motor generator 27. In this case, since the rotating motion of the first hydraulic pump 28 also can be stopped, it is possible to further reduce an energy loss.

It is noted that in the first embodiment, since the motor generator 27 does not necessarily have a generator function, it may be implemented by an electric motor.

[Second Embodiment]

Figure 5:
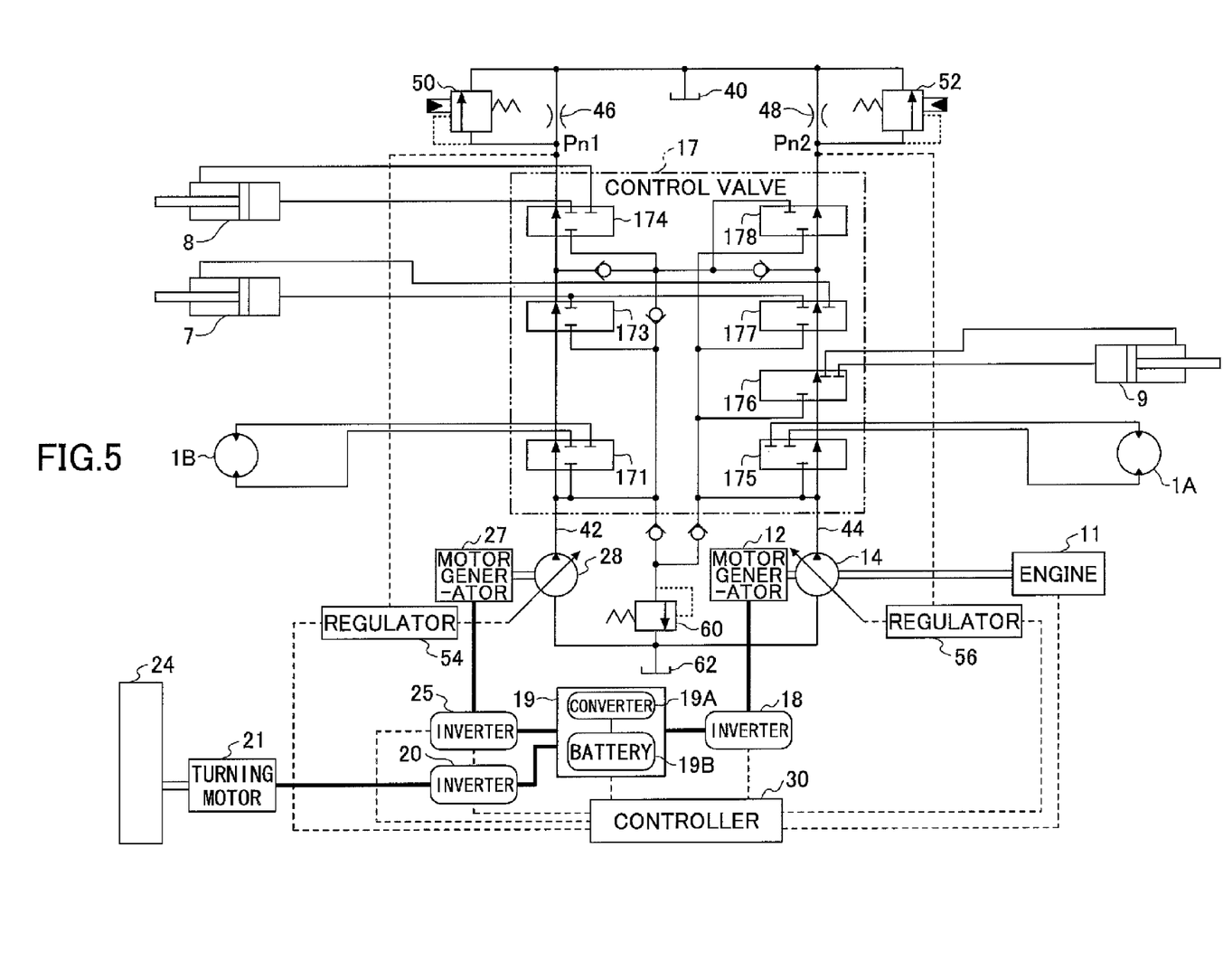
FIG. 5 is a block diagram for illustrating a main part of a hydraulic system configuration according to a second embodiment.

FIG. 5 is a block diagram for illustrating a main part of a hydraulic system configuration according to a second embodiment. In FIG. 5, elements which may be the same as corresponding elements illustrated in FIG. 1 are given the same reference numerals. Further, in FIG. 5, connections related to mechanical power are indicated by double lines, hydraulic lines are indicated by solid lines, electrical connections are indicated by bold line and connections related to control are indicated by dashed lines.

In the second embodiment, like the configuration described with reference to FIG. 1, the turning motor 21 (i.e., the electric motor) which is electrically driven by the battery unit 19 and the inverter 20 is used.

The battery unit 19 is electrically connected to the turning motor 21 via the inverter 20. An output shaft of the turning motor 21 is coupled to a turning mechanism 24 for turning an upper-part turning body of the hybrid-type construction machine 100. In this way, the turning mechanism 24 is driven with electric power from the battery unit 19. The inverter 20 is controlled based on operations of a turning operation lever by the controller 30.

The turning motor 21 is a motor generator which can perform power running and regeneration and is PWM (Pulse Width Modulation) driven by the inverter 20. Preferably, the turning motor 21 is an IMP motor in which magnets are buried inside a rotor. At the time of power running, a torque of a rotational driving force of the turning motor 21 is amplified by the turning reduction gear 24, and the upper-part turning body 3 of the hybrid-type construction machine 100 is controlled to accelerate or decelerate its rotating motion. Further, because of rotational inertia of the upper-part turning body 3 of the hybrid-type construction machine 100, the number of revolutions is increased by the turning reduction gear 24 to be transmitted to the turning motor 21, and thus regenerative electric power can be generated.

The control valve 17 includes plural switching valves 171 through 178. However, because of motorization of the turning motor 21, the switching valve 172 for the turning motor 21, which is used in the first embodiment, is omitted. The switching valves 171 through 174 are provided in a first oil line 42 connecting the discharge side of the first hydraulic pump 28 and a reservoir tank 40, and the switching valves 175 through 178 are provided in a second oil line 44 connecting the discharge side of the second hydraulic pump 14 and the reservoir tank 40.

The switching valve 171 switches supply status of the working fluid for implementing a traveling operation of the travel left motor 1B, the switching valve 173 switches supply status of the working fluid for implementing a boom-up operation (second speed) of the boom cylinder 7, and the switching valve 174 switches supply status of the working fluid for implementing an arm opening/closing operation (first speed) of the arm cylinder 8.

The switching valve 175 switches supply status of the working fluid for implementing a traveling operation of the travel right motor 1A, the switching valve 176 switches supply status of the working fluid for implementing a bucket opening/closing operation of the bucket cylinder 9, the switching valve 177 switches supply status of the working fluid for implementing a boom-up/down operation (first speed) of the boom cylinder 7, and the switching valve 178 switches supply status of the working fluid for implementing an arm-opening/closing operation (second speed) of the arm cylinder 8.

In the first oil line 42 on the side of the first hydraulic pump 28, a negative control restrictor 46 (a restrictor for negative feedback) is provided between a downstream side of the switching valve 174 and the reservoir tank 40, and a negative control pressure Pn1 (a pressure at a upstream side of the negative control restrictor 46 is output to a regulator 54 for the negative feedback. The first oil line 42 is connected to a variable pressure relief valve 50 for adjusting a relief pressure of the first oil line 42. The controller 30 and the regulator 54 control the first hydraulic pump 28 based on the negative control pressure Pn1 such that a loss of rate of discharge of the first hydraulic pump 28 returning to the reservoir tank 40 is reduced.

Similarly, in the second oil line 44 on the side of the second hydraulic pump 14, a negative control restrictor 48 (a restrictor for negative feedback) is provided between a downstream side of the switching valve 178 and the reservoir tank 40, and a negative control pressure Pn2 (a pressure at a upstream side of the negative control restrictor 48 is output to a regulator 56 for the negative feedback. The second oil line 44 is connected to a variable pressure relief valve 52 for adjusting a relief pressure of the second oil line 44. The controller 30 and the regulator 56 control the second hydraulic pump 14 based on the negative control pressure Pn2 such that a loss of rate of discharge of the second hydraulic pump 14 returning to the reservoir tank 40 is reduced (i.e., performs so-called negative control). In this way, the first hydraulic pump 28 and the second hydraulic pump 14 are mechanically separated.

Further, the first oil line 42 and the second oil line 44 are connected to a relief valve 60 for limiting the maximum pressure of the hydraulic circuit. When a pressure in the hydraulic circuit exceeds a predetermined set pressure, the relief valve 60 is activated to connect the hydraulic circuit to the reservoir tank 62.

Figure 6:
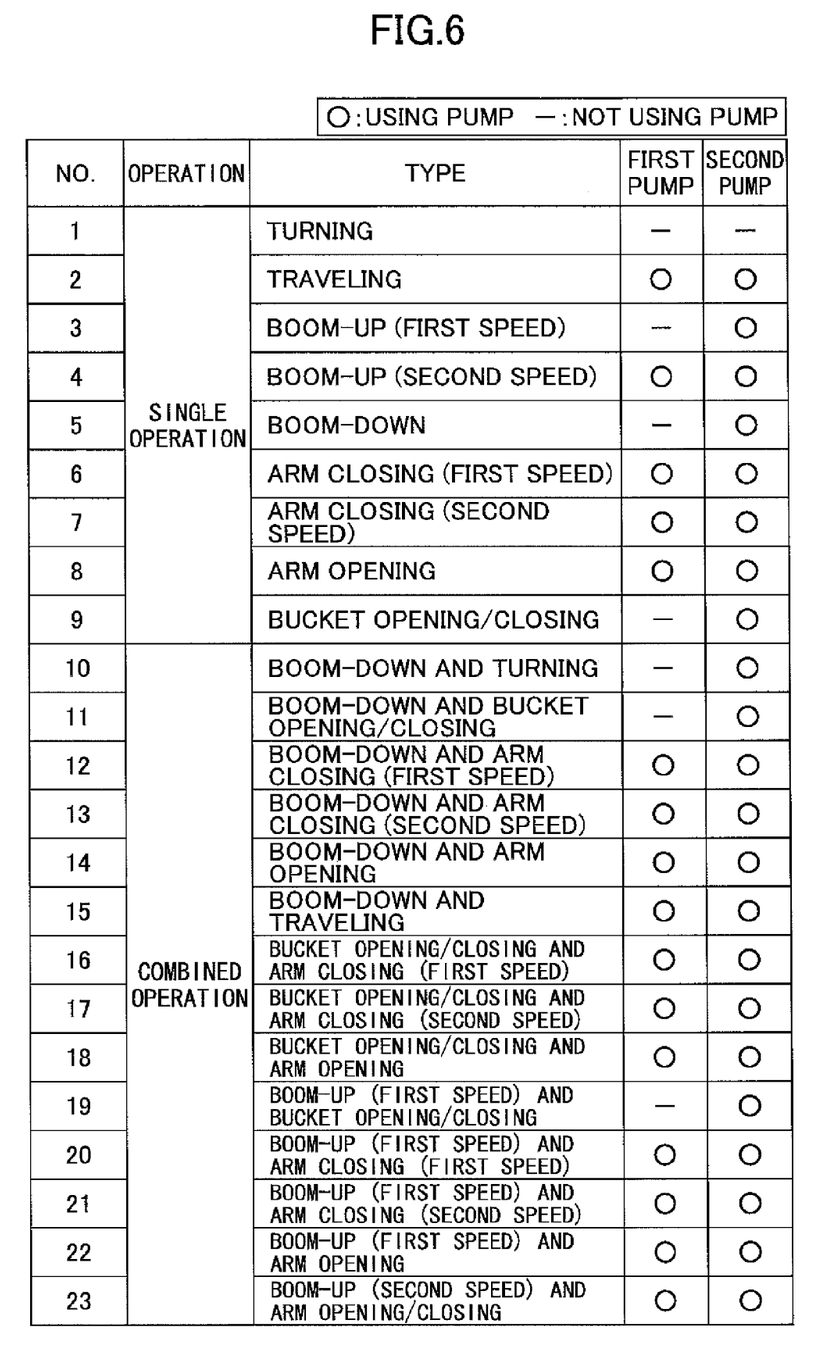
FIG. 6 is a table for illustrating a relationship between various operations of the hybrid-type construction machine 100 according to the second embodiment and hydraulic pumps used for the operations.

FIG. 6 is a table for illustrating a relationship between various operations of the hybrid-type construction machine 100 according to the second embodiment and hydraulic pumps used for the operations.

As illustrated in FIG. 6, because of motorization of the turning motor 21, at the turning operation alone, the first hydraulic pump 28 and the second hydraulic pump 14 are not operated. At that time, the turning operation alone is implemented by the turning motor 21 which is driven with electric power from the battery unit 19. Further, at the boom-up operation (first speed) alone, only the second hydraulic pump 14 is used, and thus the first hydraulic pump 28 is not operated. Further, at the boom-down operation alone, only the second hydraulic pump 14 is used, and thus the first hydraulic pump 28 is not operated. Further, at the bucket opening/closing operation alone, only the second hydraulic pump 14 is used, and thus the first hydraulic pump 28 is not operated. Further, at the combined operation of the boom-down operation and the turning operation, only the second hydraulic pump 14 is used, and thus the first hydraulic pump 28 is not operated. At that time, the turning operation alone is implemented by the turning motor 21 which is driven with electric power from the battery unit 19. Further, at the combined operation of the boom-down operation and the bucket opening/closing operation, only the second hydraulic pump 14 is used, and thus the first hydraulic pump 28 is not operated. Further, at the combined operation of the boom-up operation (first speed) and the bucket opening/closing operation, only the second hydraulic pump 14 is used, and thus the first hydraulic pump 28 is not operated.

One of feature configurations of the second embodiment is that the first hydraulic pump 28 and the second hydraulic pump 14 are arranged such that the first pump 28 controls at least one of the actuators 1A, 1B, 7, 8 and 9 independently from the second pump and the second pump 14 controls at least another one of the actuators 1A, 1B, 7, 8 and 9 independently from the first pump 28. Specifically, the first hydraulic pump 28 is arranged to control the travel left motor 1B independently from the second hydraulic pump 14, and the second hydraulic pump 14 is arranged to control the travel right motor 1A and the bucket cylinder 9 independently from the first hydraulic pump 28. However, even in this case, the first hydraulic pump 28 may be in fluid communication with the travel right motor 1A via a switching valve (not illustrated) and the second hydraulic pump 14 may in fluid communication with the travel left motor 1B via a switching valve (not illustrated).

Further, one of feature configurations of the second embodiment is that a hydraulic pump for driving an actuator(s) that is coupled to the engine 11 and the motor generator 12 includes the second hydraulic pump 14 only. In other words, only the second hydraulic pump 14 is coupled to the engine 11 and the motor generator 12 as a hydraulic pump for driving an actuator(s).

According to the feature configurations of the second embodiment, since only one of the hydraulic pump, which is used for driving an actuator(s), is coupled to the engine 11 and the motor generator 12, it is possible to reduce pumping loss at the time of idling by more than one-half with respect to the configuration in which two hydraulic pumps, which are used for driving actuators, are coupled to the engine 11 and the motor generator 12. Further, in order to compensate for the fact that only one hydraulic pump, which is used for driving an actuator(s), is coupled to the engine 11 and the motor generator 12, a hydraulic pump (the first hydraulic pump 28) for driving an actuator(s) is provided, which hydraulic pump is driven by the motor generator 27 (separate from the motor generator 12) using electric power from the battery unit 19. Therefore, it is possible to avoid waste of output while enabling supplying oil pressure and flow rate necessary for the actuators 1A, 1B, 7, 8 and 9. Specifically, as illustrated in FIG. 6, at the boom-up operation (second speed) alone, for example, the first hydraulic pump 28 and the second hydraulic pump 14 are operated and thus it is possible to supply oil pressure and flow rate necessary and sufficient for the boom cylinder 7. On the other hand, at the boom-up operation (first speed) alone, for example, only the first hydraulic pump 28 is operated to supply oil pressure and flow rate necessary and sufficient for the boom cylinder 7. Thus, it is possible to reduce an energy loss by stopping the first hydraulic pump 28.

Further, in the case of the hydraulic shovel, the turning operation is performed frequently depending on working circumstances. For this reason, at the time of performing the turning operation only, it is possible not to operate the first hydraulic pump 28. Further, it is also possible to stop even a rotating operation of the first hydraulic pump 28. Thus, since it is not necessary to pump the working fluid, it is possible to reduce the energy loss.

The turning operation is often combined with the boom operation. Even in this case, the working fluid can be supplied to the boom from the second hydraulic pump 14 which is coupled to the engine 11, and thus the rotating operation of the first hydraulic pump 28 can be stopped. Thus, since it is not necessary to pump the working fluid even at the time of the combined operations, it is possible to reduce the energy loss.

It is noted that in the second embodiment, since the motor generator 27 does not necessarily have a generator function, it may be implemented by an electric motor.

[Third Embodiment]

Figure 7:
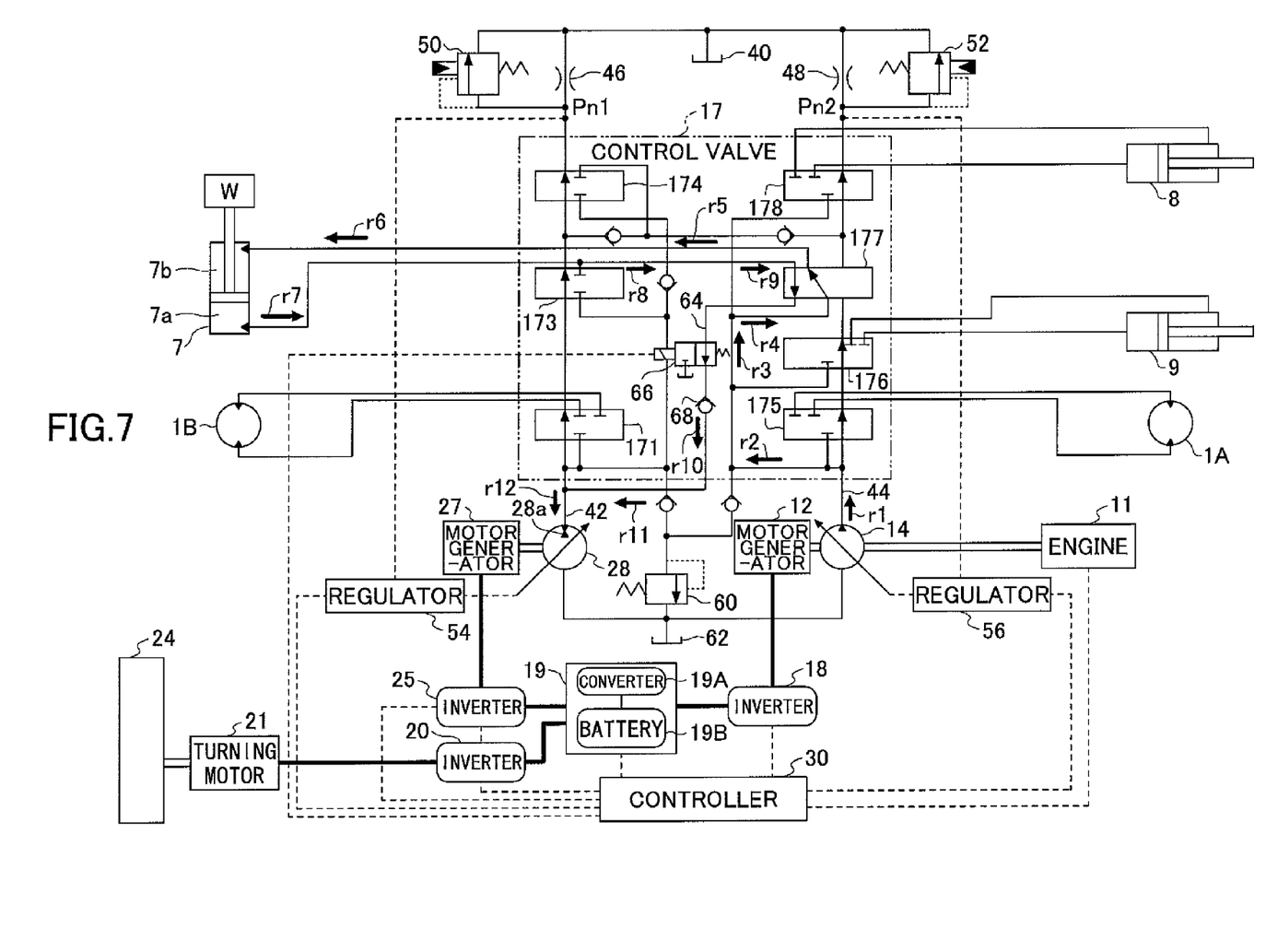
FIG. 7 is a block diagram for illustrating a main part of a hydraulic system configuration according to a third embodiment.

FIG. 7 is a block diagram for illustrating a main part of a hydraulic system configuration according to a third embodiment. In FIG. 7, elements which may be the same as corresponding elements illustrated in FIG. 1 are given the same reference numerals. Further, in FIG. 7, connections related to mechanical power are indicated by double lines, hydraulic lines are indicated by solid lines, electrical connections are indicated by bold line and connections related to control are indicated by dashed lines.

In the third embodiment, like the configuration described with reference to FIG. 1, the turning motor 21 (i.e., the electric motor) which is electrically driven by the battery unit 19 and the inverter 20 is used.

The control valve 17 includes plural switching valves 171 through 178. However, because of motorization of the turning motor 21, the switching valve 172 for the turning motor 21, which is used in the first embodiment, is omitted. The switching valves 171 through 174 are provided in a first oil line 42 connecting the discharge side of the first hydraulic pump 28 and a reservoir tank 40, and the switching valves 175 through 178 are provided in a second oil line 44 connecting the discharge side of the second hydraulic pump 14 and the reservoir tank 40.

The switching valve 171 switches supply status of the working fluid for implementing a traveling operation of the travel left motor 1B, the switching valve 173 switches supply status of the working fluid for implementing a boom-up operation (second speed) of the boom cylinder 7, and the switching valve 174 switches supply status of the working fluid for implementing an arm opening/closing operation (second speed) of the arm cylinder 8.

The switching valve 175 switches supply status of the working fluid for implementing a traveling operation of the travel right motor 1A, the switching valve 176 switches supply status of the working fluid for implementing a bucket opening/closing operation of the bucket cylinder 9, the switching valve 177 switches supply status of the working fluid for implementing a boom-up/down operation (first speed) of the boom cylinder 7, and the switching valve 178 switches supply status of the working fluid for implementing an arm-opening/closing operation (first speed) of the arm cylinder 8.

In the first oil line 42 on the side of the first hydraulic pump 28, a negative control restrictor 46 (a restrictor for negative feedback) is provided between a downstream side of the switching valve 174 and the reservoir tank 40, and a negative control pressure Pn1 (a pressure at a upstream side of the negative control restrictor 46 is output to a regulator 54 for the negative feedback. The first oil line 42 is connected to a variable pressure relief valve 50 for adjusting a relief pressure of the first oil line 42. The controller 30 and the regulator 54 control the first hydraulic pump 28 based on the negative control pressure Pn1 such that a loss of rate of discharge of the first hydraulic pump 28 returning to the reservoir tank 40 is reduced.

Similarly, in the second oil line 44 on the side of the second hydraulic pump 14, a negative control restrictor 48 (a restrictor for negative feedback) is provided between a downstream side of the switching valve 178 and the reservoir tank 40, and a negative control pressure Pn2 (a pressure at a upstream side of the negative control restrictor 48 is output to a regulator 56 for the negative feedback. The second oil line 44 is connected to a variable pressure relief valve 52 for adjusting a relief pressure of the second oil line 44. The controller 30 and the regulator 56 control the second hydraulic pump 14 based on the negative control pressure Pn2 such that a loss of rate of discharge of the second hydraulic pump 14 returning to the reservoir tank 40 is reduced (i.e., performs so-called negative control). In this way, the first hydraulic pump 28 and the second hydraulic pump 14 are mechanically separated.

Further, the first oil line 42 and the second oil line 44 are connected to a relief valve 60 for limiting the maximum pressure of the hydraulic circuit. When a pressure in the hydraulic circuit exceeds a predetermined set pressure, the relief valve 60 is activated to connect the hydraulic circuit to the reservoir tank 62.

In the third embodiment, the first hydraulic pump 28 is of a pump motor type which is capable of regenerating the energy in concert with the motor generator 27. Specifically, at the time of functioning as a motor, the first hydraulic pump 28 is rotated by the returning oil which has flowed from the head chamber of the boom cylinder 7 to be discharged to the tank 62. This rotation causes the motor generator 27 to rotate, thereby performing a regenerative operation. Correspondingly, a regenerative circuit 64 is provided between the switching valve 177 for the first speed operation of the boom cylinder 7 and the first hydraulic pump 28. The regenerative circuit 64 establishes fluid communication between the head chamber 7a of the boom cylinder 7 and the first hydraulic pump 28 according to the position of the switching valve 177. A flow control valve 66, which is controlled by the controller 30, and a check valve 68 are provided in the regenerative circuit 64.

Further, a port 28a of the first hydraulic pump 28 is a port for discharge and inflow. The first hydraulic pump 28 maintains the same rotating direction in the case of functioning as a pump for pumping the working fluid from the tank 62 to the respective actuators and in the case of functioning as a motor for having the returning oil flowing therein from the head chamber 7a of the boom cylinder 7 to discharge it to the tank 62. Thus, even when the discharging direction changes, it is possible to smoothly switch the function between the pump and the motor.

In FIG. 7, the flow of the working fluid in the hydraulic circuit including the regenerative circuit 64 at the time of the boom down operation is shown by arrows r1 through r12. At the time of the boom-down operation, the working fluid discharged from the first hydraulic pump 28 is supplied to the rod chamber 7b of the boom cylinder 7 via the switching valve 177 as indicated by the arrows r1 through r6. At the same time, the working fluid discharged from the head chamber 7a is supplied to the first hydraulic pump 28 via the switching valve 177 and through the regenerative circuit 64 as indicated by the arrows r7 through r12. Thus, the first hydraulic pump 28 causes the motor generator 27 to perform the regenerative operation. It is noted that regenerative energy (electric energy) obtained at that time is used to charge the battery 19B of the battery unit 19 via the inverter 25. The energy may be supplied to the turning motor 21 via the inverter 20 or may be supplied to the motor generator 12 via the inverter 18.

Figure 8:
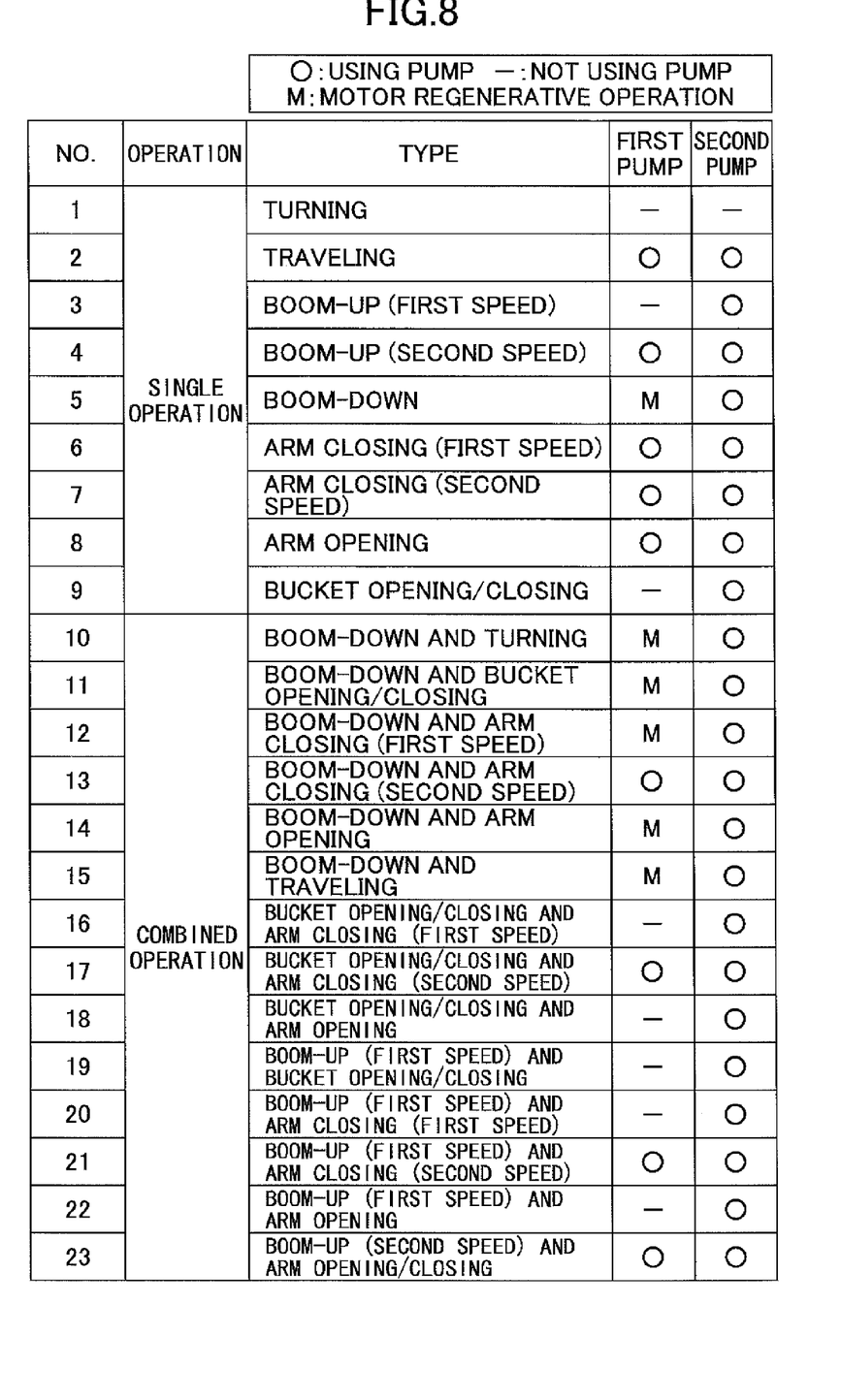
FIG. 8 is a table for illustrating a relationship between various operations of the hybrid-type construction machine 100 according to the third embodiment and hydraulic pumps used for the operations.

FIG. 8 is a table for illustrating a relationship between various operations of the hybrid-type construction machine 100 according to the third embodiment and hydraulic pumps used for the operations.

As illustrated in FIG. 8, because of motorization of the turning motor 21, at the turning operation alone, the first hydraulic pump 28 and the second hydraulic pump 14 are not operated. At that time, the turning operation alone is implemented by the turning motor 21 which is driven with electric power from the battery unit 19. Further, at the boom-up operation (first speed) alone, only the second hydraulic pump 14 is used, and thus the first hydraulic pump 28 is not operated. Further, at the boom-down operation alone, only the second hydraulic pump 14 is used, and the first hydraulic pump 28 performs the regenerative operation. Further, at the bucket opening/closing operation alone, only the second hydraulic pump 14 is used, and thus the first hydraulic pump 28 is not operated. Further, at the combined operation of the boom-down operation and the turning operation, only the second hydraulic pump 14 is used, and the first hydraulic pump 28 performs the regenerative operation. At that time, the turning operation alone is implemented by the turning motor 21 which is driven with electric power from the battery unit 19. Further, at the combined operation of the boom-down operation and the bucket opening/closing operation, only the second hydraulic pump 14 is used, and the first hydraulic pump 28 performs the regenerative operation. Further, at the combined operation of the boom-down operation and the arm closing operation (first speed), only the second hydraulic pump 14 is used, and the first hydraulic pump 28 performs the regenerative operation. Further, at the combined operation of the boom-down operation and the arm opening operation, only the second hydraulic pump 14 is used, and the first hydraulic pump 28 performs the regenerative operation. Further, at the combined operation of the boom-down operation and the traveling operation, only the second hydraulic pump 14 is used, and the first hydraulic pump 28 performs the regenerative operation. At that time, the traveling is implemented with only the second hydraulic pump 14. Further, at the combined operation of the bucket opening/closing operation and the arm closing operation (first speed), only the second hydraulic pump 14 is used, and thus the first hydraulic pump 28 is not operated. Further, at the combined operation of the bucket opening/closing operation and the arm opening operation, only the second hydraulic pump 14 is used, and thus the first hydraulic pump 28 is not operated. Further, at the combined operation of the boom-up operation (first speed) and the bucket opening/closing operation, only the second hydraulic pump 14 is used, and thus the first hydraulic pump 28 is not operated. Further, at the combined operation of the boom-up operation (first speed) and the arm closing operation (first speed), only the second hydraulic pump 14 is used, and thus the first hydraulic pump 28 is not operated. Further, at the combined operation of the boom-up operation (first speed) and the arm opening operation, only the second hydraulic pump 14 is used, and thus the first hydraulic pump 28 is not operated.

One of feature configurations of the third embodiment is that the first hydraulic pump 28 and the second hydraulic pump 14 are arranged such that the first pump 28 controls at least one of the actuators 1A, 1B, 7, 8 and 9 independently from the second pump 14 and the second pump 14 controls at least another one of the actuators 1A, 1B, 7, 8 and 9 independently from the first pump 28. Specifically, the first hydraulic pump 28 is arranged to control the travel left motor 1B independently from the second hydraulic pump 14, and the second hydraulic pump 14 is arranged to control the travel right motor 1A and the bucket cylinder 9 independently from the first hydraulic pump 28. However, even in this case, the first hydraulic pump 28 may be in fluid communication with the travel right motor 1A via a switching valve (not illustrated) and the second hydraulic pump 14 may in fluid communication with the travel left motor 1B via a switching valve (not illustrated).

Further, one of feature configurations of the third embodiment is that a hydraulic pump for driving an actuator(s) that is coupled to the engine 11 and the motor generator 12 includes the second hydraulic pump 14 only. In other word, only the second hydraulic pump 14 is coupled to the engine 11 and the motor generator 12 as a hydraulic pump for driving an actuator(s).

According to the feature configurations of the third embodiment, since only one of the hydraulic pumps, which is used for driving an actuator(s), is coupled to the engine 11 and the motor generator 12, it is possible to reduce pumping loss at the time of idling by more than one-half with respect to the configuration in which two hydraulic pumps, which are used for driving actuators, are coupled to the engine 11 and the motor generator 12. Further, in order to compensate for the fact that only one hydraulic pump, which is used for driving an actuator(s), is coupled to the engine 11 and the motor generator 12, a hydraulic pump (the first hydraulic pump 28) for driving an actuator(s) is provided, which hydraulic pump is driven by the motor generator 27 (separate from the motor generator 12) using electric power from the battery unit 19. Therefore, it is possible to avoid waste of output while enabling supplying oil pressure and flow rate necessary for the actuators 1A, 1B, 7, 8 and 9. Specifically, as illustrated in FIG. 8, at the boom-up operation (second speed) alone, for example, the first hydraulic pump 28 and the second hydraulic pump 14 are operated and thus it is possible to supply oil pressure and flow rate necessary and sufficient for the boom cylinder 7. On the other hand, at the bucket opening/closing operation alone, for example, only the first hydraulic pump 28 is operated to supply oil pressure and flow rate necessary and sufficient for the bucket cylinder 9. Thus, it is possible to reduce an energy loss by stopping the first hydraulic pump 28. Further, in particular, according to the third embodiment, the first hydraulic pump 28 is of a pump motor type and the regenerative circuit 64 is provided between the first hydraulic pump 28 and the boom cylinder 7. With this arrangement, regenerative energy can be obtained by the first hydraulic pump 28 and the motor generator 27 at the time of the operations involving the boom-down operation (see No. 5, 10, 11, 12, 14 and 15 in FIG. 8). With this arrangement, it is possible to implement the regenerative operation in association with the boom-down operation, thereby implementing further energy saving.

Further, in contrast with the first and second embodiments, one of feature configurations of the third embodiment is that the switching valve 178 for the arm opening/closing operation (first speed) of the arm cylinder 8 is provided in the second oil line 44 on the side of the second hydraulic pump 14, and the switching valve 174 for the arm opening/closing operation (second speed) of the arm cylinder 8 is provided in the first oil line 42 on the side of the first hydraulic pump 28. With this arrangement, it is possible to increase the number of operations (i.e., the number of operation types) for which the first hydraulic pump 28 can be stopped. For example, as illustrated in FIG. 8 in contrast with FIG. 3 or FIG. 6, at the time of the combined operation of the bucket opening/closing operation and the arm opening operation (No. 18), the combined operation of the boom-up operation (first speed) and the arm closing operation (first speed) (No. 20), etc., the first hydraulic pump 28 and the second hydraulic pump 14 are operated in the first and second embodiments, while only the second hydraulic pump 14 may be operated in the third embodiment. However, as a variant of the third embodiment, as is the case with the first and second embodiments, the switching valve 178 for the arm opening/closing operation (first speed) of the arm cylinder 8 may be provided in the first oil line 42 on the side of the first hydraulic pump 28, and the switching valve 174 for the arm opening/closing operation (second speed) of the arm cylinder 8 may be provided in the second oil line 44 on the side of the second hydraulic pump 14. In this case, it is possible to obtain the effects of the second embodiment and improve the energy saving by the regenerative operation.

The present invention is disclosed with reference to the preferred embodiments. However, it should be understood that the present invention is not limited to the above-described embodiments, and variations and modifications may be made without departing from the scope of the present invention.

The present application is based on Japanese Priority Application No. 2009-213642, filed on Sep. 15, 2009, the entire contents of which are hereby incorporated by reference.

The invention claimed is:

1. A hybrid-type construction machine comprising
an engine;
an electric power accumulator;
first and second pumps;
an electric motor which drives the first pump; and
a plural actuators which are driven by the first and second pumps,
wherein the first and second pumps are arranged such that the first pump controls at least one of the actuators independently from the second pump and the second pump controls at least another one of the actuators independently from the first pump,
the first pump is electrically driven by the electric motor with electric power from the electric power accumulator, and
the second pump is directly coupled to the engine,
the first and second pumps are connected to a common control valve, and
at least two of the actuators are coupled to each of the first and second pumps via the common control valve.

2. The hybrid-type construction machine of claim 1, wherein the common control valve includes switching valves configured to switch supply status of working fluid to the actuators.

3. The hybrid-type construction machine of claim 1, further comprising a motor generator which is mechanically coupled to the engine.

4. The hybrid-type construction machine of claim 1, wherein the first pump is in a non-operated status when the engine is in an idling status.

5. The hybrid-type construction machine of claim 1, wherein the actuators include a boom actuator connected to the first pump, and a regenerative circuit is provided between the first pump and the boom actuator.

6. The hybrid-type construction machine of claim 1, further comprising a turning motor configured to perform a turning operation of the construction machine, wherein the turning motor is driven with electric power from the electric power accumulator or regenerative energy generated by the electric motor.

7. The hybrid-type construction machine of claim 5, further comprising a motor generator directly coupled to the engine, wherein the motor generator is supplied with regenerative energy generated by the electric motor.

8. The hybrid-type construction machine of claim 6, further comprising a motor generator directly coupled to the engine, wherein the motor generator is supplied with regenerative energy generated by the electric motor.

\* \* \* \* \*